US006283423B1

(12) United States Patent
Rindfusz

(10) Patent No.: US 6,283,423 B1
(45) Date of Patent: Sep. 4, 2001

(54) EYEWEAR HOLDING DEVICE

(76) Inventor: John Rindfusz, 3642 Friendship Farm Dr., Buford, GA (US) 30519

( * ) Notice: Subject to any disclaimer, the term of this patent is extended or adjusted under 35 U.S.C. 154(b) by 0 days.

(21) Appl. No.: 09/521,734

(22) Filed: Mar. 9, 2000

Related U.S. Application Data

(60) Provisional application No. 60/125,911, filed on Mar. 24, 1999.

(51) Int. Cl.[7] .......... A45D 42/14

(52) U.S. Cl. .......... 248/206.2; 248/902; 351/57

(58) Field of Search .......... 248/206.2, 902; 351/57

(56) References Cited

U.S. PATENT DOCUMENTS 4,542,965 * 9/1985 Shedrow .......... 351/57
4,867,402 * 9/1989 Benson et al. .......... 248/902 X
4,903,925 * 2/1990 Park .......... 248/902 X
5,592,244 * 1/1997 Vyhmeister .......... 248/902 X
6,102,346 * 8/2000 Visser .......... 248/902 X

* cited by examiner

*Primary Examiner*—Ramon O. Ramirez
(74) *Attorney, Agent, or Firm*—Goldstein Law Offices, P.C.

(57) ABSTRACT

An eyewear holding device including a suction cup adapted for engaging a selected surface within an automobile. The suction cup has a post extending rearwardly from a rear surface thereof. An eyewear support is secured to a free end of the post of the suction cup. The eyewear support includes an arcuate support portion dimensioned for supporting a pair of rims with connected nose piece thereon. An eyewear arms support is provided that is adapted for supporting a pair of arms of the eyewear when positioned on the eyewear support. The arms support has a plate extending downwardly from the arcuate support portion in an angular orientation. The plate has an upwardly turned lower portion for receiving ear pieces of the pair of arms thereon.

4 Claims, 2 Drawing Sheets

20
20
18
12
14
26
16
22
24

EYEWEAR HOLDING DEVICE

CROSS REFERENCES AND RELATED SUBJECT MATTER

This application relates to subject matter contained in provisional patent application Ser. No. 60/125,911, filed in the United States Patent & Trademark Office on Mar. 24, 1999.

BACKGROUND OF THE INVENTION

The present invention relates to an eyewear holding device and more particularly pertains to protecting a pair of glasses when not being worn.

It is well known that many automobile drivers wear sunglasses to protect the driver's eyes from the sun's rays as well as to aid in observing the road ahead. However, many situations arise where it becomes necessary to remove the sunglasses, or alternately, a standard pair of eyeglasses, and a problem emerges as to where the eyeglasses or sunglasses could be safely stored. Ordinarily, the eyewear is placed on the seat next to the driver or on the dashboard. The problem associated with these places is the possible damage that could occur. If placed on the seat, a person could sit on the eyewear causing significant damage. If placed on the dashboard, the eyewear could slide around and possibly fall off of the dashboard thereby causing damage.

The present invention attempts to solve these problems by providing a device that can safely hold eyewear within an automobile so as to avoid the eyewear from being broken.

The use of eyeglass supports is known in the prior art. More specifically, eyeglass supports heretofore devised and utilized for the purpose of supporting a pair of eyeglasses are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,903,925 to Mark discloses a device for holding a pair of sunglasses in a vehicle, comprised of triangular elements for supporting the bridge, and a suction cup for mounting to a non-porous surface. U.S. Pat. No. 5,139,324 to West discloses means for storing a pair of eyewear on a dashboard using a suction cup. U.S. Pat. No. 4,779,829 to Rockne and U.S. Pat. No. 3,291,429 to Neanhouse each show additional means for mounting eyeglasses.

While these devices fulfill their respective, particular objective and requirements, the aforementioned patents do not describe an eyewear holding device for protecting a pair of glasses when not being worn.

In this respect, the eyewear holding device according to the present invention substantially departs from the conventional concepts and designs of the prior art, and in doing so provides an apparatus primarily developed for the purpose of protecting a pair of glasses when not being worn.

Therefore, it can be appreciated that there exists a continuing need for new and improved eyewear holding device which can be used for protecting a pair of glasses when not being worn. In this regard, the present invention substantially fulfills this need.

SUMMARY OF THE INVENTION

In the view of the foregoing disadvantages inherent in the known types of eyeglass supports now present in the prior art, the present invention provides an improved eyewear holding device. As such, the general purpose of the present invention, which will be described subsequently in greater detail, is to provide a new and improved eyewear holding device and method which has all the advantages of the prior art and none of the disadvantages.

To attain this, the present invention essentially comprises a suction cup adapted for engaging a selected surface within an automobile. The suction cup has a post extending rearwardly from a rear surface thereof. An eyewear support is secured to a free end of the post of the suction cup by means of a hinge. This hinge allows the eyewear support to be adjusted upward or downward, while the suction cup remains stationery. The eyewear support includes an arcuate support portion dimensioned for supporting a pair of rims with connected nose piece thereon. An upper surface of the arcuate support portion has a layer of protective material disposed thereon. The protective material prevents lenses of the eyewear from being scratched while positioned on the arcuate support portion. The eyewear support further includes a pair of side guards extending upwardly from opposing sides of the arcuate support portion at a central location thereof. The side guards prevent the eyewear from sliding off of the arcuate support portion. An eyewear arms support is provided that is adapted for supporting a pair of arms of the eyewear when positioned on the eyewear support. The arms support has a plate extending downwardly from the arcuate support portion in an angular orientation. The plate has an upwardly turned lower portion for receiving ear pieces of the pair of arms thereon.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved eyewear holding device which has all the advantages of the prior art eyeglass supports and none of the disadvantages.

It is another object of the present invention to provide a new and improved eyewear holding device which may be easily and efficiently manufactured and marketed.

It is a further object of the present invention to provide a new and improved eyewear holding device which is of durable and reliable construction.

An even further object of the present invention is to provide a new and improved eyewear holding device which is susceptible of a low cost of manufacture with regard to both materials and labor, and which accordingly is then susceptible of low prices of sale to the consuming public, thereby making such an eyewear holding device economically available to the buying public.

Even still another object of the present invention is to provide a new and improved eyewear holding device for protecting a pair of glasses when not being worn.

Lastly, it is an object of the present invention to provide a new and improved eyewear holding device including a suction cup adapted for engaging a selected surface within an automobile. The suction cup has a post extending rearwardly from a rear surface thereof. An eyewear support is secured to a free end of the post of the suction cup. The eyewear support includes an arcuate support portion dimensioned for supporting a pair of rims with connected nose piece thereon. An eyewear arms support is provided that is adapted for supporting a pair of arms of the eyewear when positioned on the eyewear support. The arms support has a plate extending downwardly from the arcuate support portion in an angular orientation. The plate has an upwardly turned lower portion for receiving ear pieces of the pair of arms thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 2:
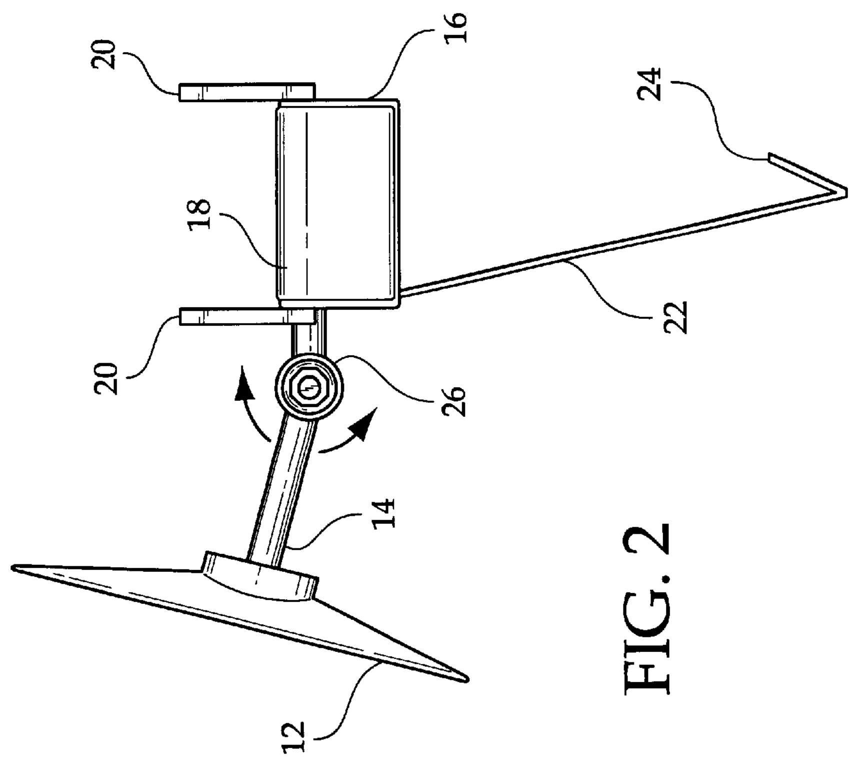
FIG. 2 is a side elevational view of the present invention.
Figure 1:
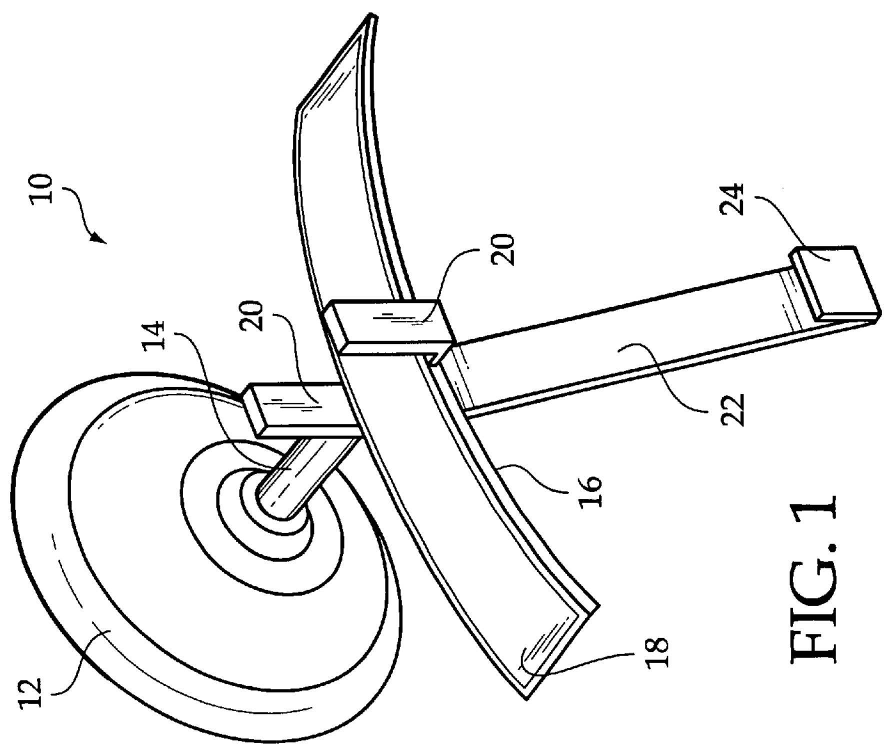
FIG. 1 is a perspective view of the preferred embodiment of the eyewear holding device constructed in accordance with the principles of the present invention.
Figure 3:
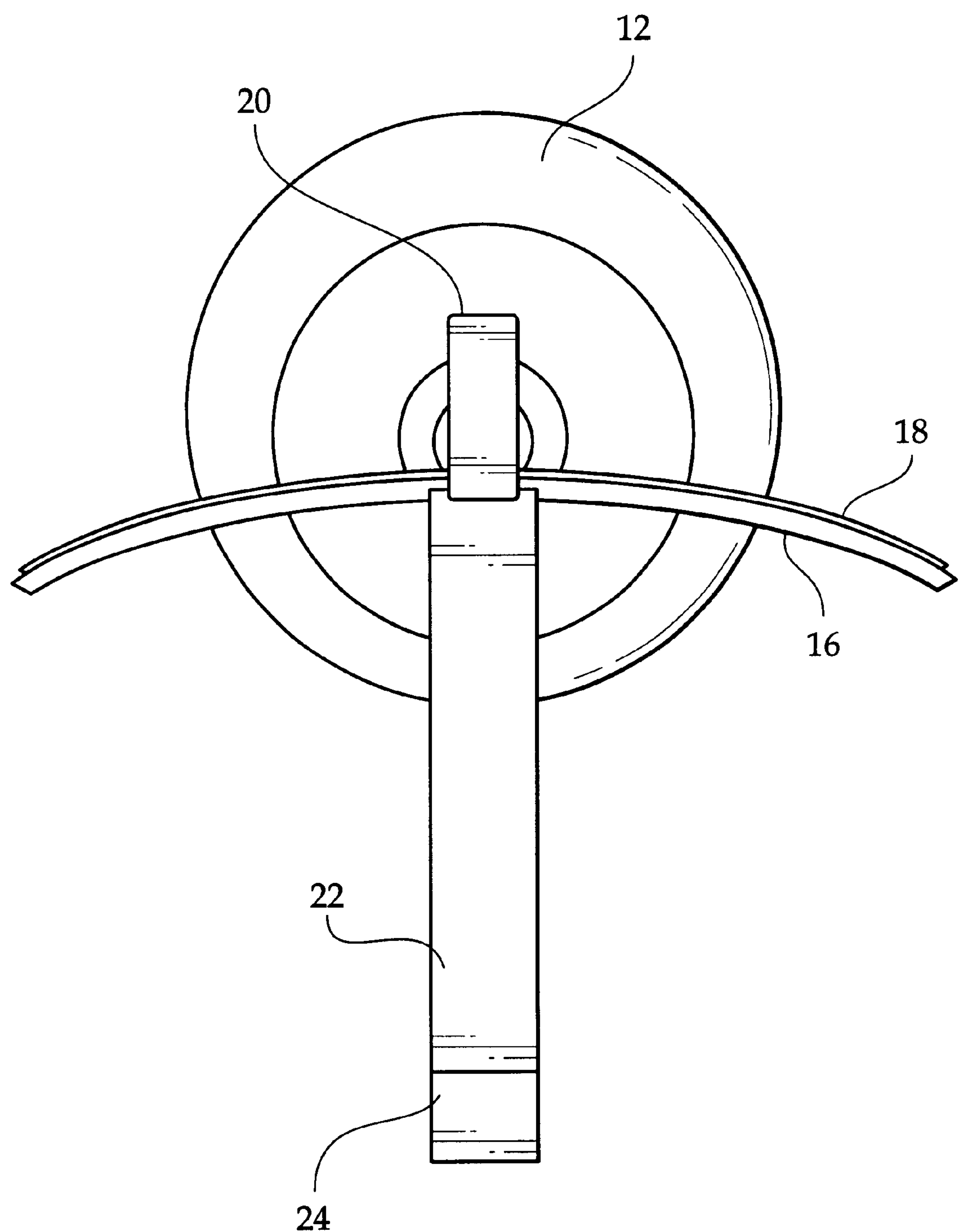
FIG. 3 is a front elevational view of the present invention.

With reference now to the drawings, and in particular, to FIGS. 1 through 3 thereof, the preferred embodiment of the new and improved eyewear holding device embodying the principles and concepts of the present invention and generally designated by the reference number 10 will be described.

Specifically, it will be noted in the various Figures that the device relates to a eyewear holding device for protecting a pair of glasses when not being worn. In its broadest context, the device consists of a suction cup, an eyewear support, and an eyewear arms support. Such components are individually configured and correlated with respect to each other so as to attain the desired objective.

The suction cup 12 is adapted for engaging a selected surface within an automobile. Typically, the suction cup 12 will be secured to the windshield or one of the side windows. The suction cup 12 has a post 14 extending rearwardly from a rear surface thereof.

The eyewear support is secured to a free end of the post 14 of the suction cup 12 by means of a hinge 26. The hinge 26 allows the eyewear support to be adjusted upward or downward while maintaining the suction cup 12 in a stationery position. The eyewear support includes an arcuate support portion 16 dimensioned for supporting a pair of rims with connected nose piece thereon. An upper surface of the arcuate support portion 16 has a layer of protective material 18 disposed thereon. The protective material 18 prevents lenses of the eyewear from being scratched while positioned on the arcuate support portion 16. The eyewear support further includes a pair of side guards 20 extending upwardly from opposing sides of the arcuate support portion 16 at a central location thereof. The side guards 20 prevent the eyewear from sliding off of the arcuate support portion 16.

The eyewear arms support is adapted for supporting a pair of arms of the eyewear when positioned on the eyewear support. The arms support has a plate 22 extending downwardly from the arcuate support portion 16 in an angular orientation. The plate 22 has an upwardly turned lower portion 24 for receiving ear pieces of the pair of arms thereon. When the eyewear is positioned on the arcuate support portion 16, the pair of arms of the eyewear will be bent inwardly in a V-shaped orientation whereby the tips of the ear pieces will rest on the upwardly turned lower portion 24.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An eyewear holding device for protecting a pair of glasses when not being worn comprising, in combination:

a suction cup adapted for engaging a selected surface within an automobile, the suction cup having a post extending rearwardly from a rear surface thereof;

an eyewear support secured to a free end of the post of the suction cup by means of a hinge, the eyewear support including an arcuate support portion dimensioned for supporting a pair of rims with connected nose piece thereon, an upper surface of the arcuate support portion having a layer of protective material disposed thereon, the protective material preventing lenses of the eyewear from being scratched while positioned on the arcuate support portion, the eyewear support further including a pair of side guards extending upwardly from opposing sides of the arcuate support portion at a central location thereof, the side guards preventing the eyewear from sliding off of the arcuate support portion;

an eyewear arms support adapted for supporting a pair of arms of the eyewear when positioned on the eyewear support, the arms support having a plate extending downwardly from the arcuate support portion in an angular orientation, the plate having an upwardly turned lower portion for receiving ear pieces of the pair of arms thereon.

2. An eyewear holding device for protecting a pair of glasses when not being worn comprising, in combination:

a suction cup adapted for engaging a selected surface within an automobile, the suction cup having a post extending rearwardly from a rear surface thereof;

an eyewear support secured to a free end of the post of the suction cup by means of a hinge, the eyewear support including an arcuate support portion dimensioned for supporting a pair of rims with connected nose piece thereon;

an eyewear arms support adapted for supporting a pair of arms of the eyewear when positioned on the eyewear support, the arms support having a plate extending downwardly from the arcuate support portion in an angular orientation, the plate having an upwardly turned lower portion for receiving ear pieces of the pair of arms thereon.

3. The eyewear holding device as set forth in claim 2 wherein an upper surface of the arcuate support portion having a layer of protective material disposed thereon, the protective material preventing lenses of the eyewear from being scratched while positioned on the arcuate support portion.

4. The eyewear holding device as set forth in claim 2 wherein the eyewear support further includes a pair of side guards extending upwardly from opposing sides of the arcuate support portion at a central location thereof, the side guards preventing the eyewear from sliding off of the arcuate support portion.

* * * * *